(12) United States Patent
Scott et al.

(10) Patent No.: US 11,346,578 B2
(45) Date of Patent: May 31, 2022

(54) CONDUIT FITTING WITH INTEGRATED CONDENSATE TRAP

(71) Applicant: Rheem Manufacturing Company, Atlanta, GA (US)

(72) Inventors: Timothy D. Scott, Tallassee, AL (US); William Jason Hall, Prattville, AL (US); Brad Windon, Montgomery, AL (US); Brian Shaw, Montgomery, AL (US); Piyush Porwal, Montgomery, AL (US); Ashwin Rao, Montgomery, AL (US); Matthew S. Park, Auburn, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 466 days.

(21) Appl. No.: 16/231,198

(22) Filed: Dec. 21, 2018

(65) Prior Publication Data
US 2019/0203976 A1    Jul. 4, 2019

Related U.S. Application Data

(60) Provisional application No. 62/611,411, filed on Dec. 28, 2017.

(51) Int. Cl.
| | | |
|---|---|---|
| *F16L 55/07* | (2006.01) | |
| *F24H 8/00* | (2022.01) | |

(52) U.S. Cl.
CPC .............. *F24H 8/006* (2013.01); *F16L 55/07* (2013.01)

(58) Field of Classification Search
CPC ............ F25D 21/14; F16L 55/07; F24H 8/006
See application file for complete search history.

(56) References Cited

U.S. PATENT DOCUMENTS

| | | | | |
|---|---|---|---|---|
| 5,115,798 | A * | 5/1992 | Moore, Jr. et al. | F24H 8/006 122/14.1 |
| 5,687,678 | A | 11/1997 | Suchomel et al. | |
| 7,290,503 | B2 | 11/2007 | Missoum et al. | |
| 7,559,293 | B2 | 7/2009 | Gordon et al. | |
| 7,836,856 | B2 | 11/2010 | Mullen et al. | |
| 8,161,918 | B2 | 4/2012 | Ma et al. | |
| 8,657,863 | B2 * | 2/2014 | Quisenberry et al. | A61B 18/203 607/107 |
| 8,961,708 | B2 * | 2/2015 | Kaiser et al. | B08B 9/0325 134/166 C |
| 9,945,331 | B2 * | 4/2018 | Vigild et al. | F28G 15/003 |
| 10,865,996 | B2 * | 12/2020 | Joyner, Jr. et al. | F16T 1/34 |

(Continued)

FOREIGN PATENT DOCUMENTS

| | | | | |
|---|---|---|---|---|
| DE | 102012112852 | * | 6/2013 | ............... F16L 7/00 |
| FR | 2895492 B3 | | 11/2007 | |

OTHER PUBLICATIONS

"High Efficient Stainless Steel Gas-Fired Water Heater." Phoenix Light Duty. 4 pages. www.htproducts.com; Jun. 2017.

*Primary Examiner* — Kevin L Lee
(74) *Attorney, Agent, or Firm* — Troutman Pepper Hamilton Sanders LLP

(57) ABSTRACT

A conduit fitting for an exhaust duct includes a conduit and a condensate trap. The conduit fitting defines an interior space partitioned into an upper conduit and a lower condensate reservoir. The condensate reservoir can be configured to contain a neutralizing agent for neutralizing acidic condensate prior to it exiting the reservoir.

22 Claims, 11 Drawing Sheets

(56) References Cited

U.S. PATENT DOCUMENTS

| | | | | |
|---|---|---|---|---|
| 2002/0166587 A1* | 11/2002 | Weaver | ................ | E02D 31/008 |
| | | | | 137/312 |
| 2004/0040597 A1* | 3/2004 | Cheng | ................... | F16L 55/24 |
| | | | | 137/247.51 |
| 2016/0334155 A1* | 11/2016 | Sjogren | .................. | F24F 13/22 |
| 2021/0048364 A1* | 2/2021 | Yin et al. | ................ | E03B 7/071 |

\* cited by examiner

CONDUIT FITTING WITH INTEGRATED CONDENSATE TRAP

PRIORITY CLAIM

The present application claims priority to U.S. Patent Application No. 62/611,411 titled "Conduit Fitting With Integrated Condensate Trap" and filed on Dec. 28, 2017, the entire contents of which is incorporated herein by reference.

TECHNICAL FIELD

Embodiments of the technology relate generally to a conduit fitting and more particularly to an exhaust conduit fitting to be part of an exhaust duct of a gas-burning appliance or system.

BACKGROUND

Most new residential and commercial heating and hot water systems include a furnace, boiler, or domestic water heater of the high efficiency condensing type. High-efficiency condensing-type appliances extract additional heat from the water vapor in the flue gas. As a result, the flue gas drops below its dew point and vapor present in the flue gas starts to condense. Condensation of flue gas produces an acidic solution typically containing nitric, nitrous, sulfuric, sulfurous and hydrochloric acids, which are produced from the nitrogen oxides, sulfur oxides and hydrogen chloride present in natural gas.

Most state and local codes prohibit anyone from allowing acidic liquid into a drainage system. Acidic condensate can damage piping systems, sewerage systems, treatment facilities, septic systems and other items with which it may come in contact. Neutralization of the acidic condensate is required to avoid damage and to comply with the state and local codes. Presently, it is the responsibility of the plumbing professional to install a cartridge or other vessel containing a neutralizing agent at a point in the drain line to follow state and local plumbing codes.

There are several disadvantages with the current design. For example, there is a chance the neutralizing cartridge is never installed putting the piping system at risk. Many purchasers of high efficiency appliances may not be aware of this additional step to confirm the cartridge has actually been installed. Also, depending on the volume of condensation, such vessels can be unsightly or awkward to incorporate into the space provided for the appliance.

The foregoing background information is provided to reveal information believed by the applicant to be of possible relevance to the present disclosure. No admission is necessarily intended, nor should be construed, that any of the preceding information constitutes prior art against the present disclosure.

SUMMARY

The present disclosure is related to a conduit fitting that can form part of an exhaust duct and that has an integrated condensate trap (also referred to herein as a reservoir) to facilitate the pooling of condensate formed as flue gas cools within the exhaust duct.

In one aspect, the present disclosure relates to a conduit fitting for an exhaust duct that comprises a body defining an interior and having a partition that at least partially divides the interior into an upper interior portion and a lower interior portion. The upper interior portion is configured to be a conduit, and the lower interior portion is configured to be a reservoir for condensate. The body also defines a conduit inlet and a conduit outlet, and the partition defines a first opening that fluidly connects the upper interior portion to the lower interior portion. In some embodiments, the conduit inlet is configured to couple to an exhaust outlet of a gas burning appliance.

In another aspect, the disclosure relates to a conduit fitting comprising an elbow and a condensate collector. The elbow comprises a conduit inlet, a conduit outlet, a wall, and at least one opening in the wall, wherein the elbow is configured to attach to the condensate collector. The condensate collector comprises reservoir outlet. In some embodiments, the conduit inlet is configured to couple to an exhaust outlet of a gas burning appliance.

These and other aspects will be described further in the example embodiments set forth herein.

BRIEF DESCRIPTION OF THE FIGURES

The foregoing and other features and aspects of the present disclosure are best understood with reference to the following description of certain example embodiments, when read in conjunction with the accompanying drawings, wherein:

FIG. 1A illustrates a top perspective view. FIG. 1B illustrates a side view. FIG. 1C illustrates a cross-sectional side view taken along line A-A shown in FIG. 1A. FIG. 1D illustrates a cross-sectional top view taken along line B-B shown in FIG. 1B. FIG. 1E illustrates a cross-sectional, bottom perspective view taken along line C-C shown in FIG. 1B.

Figure 1A:
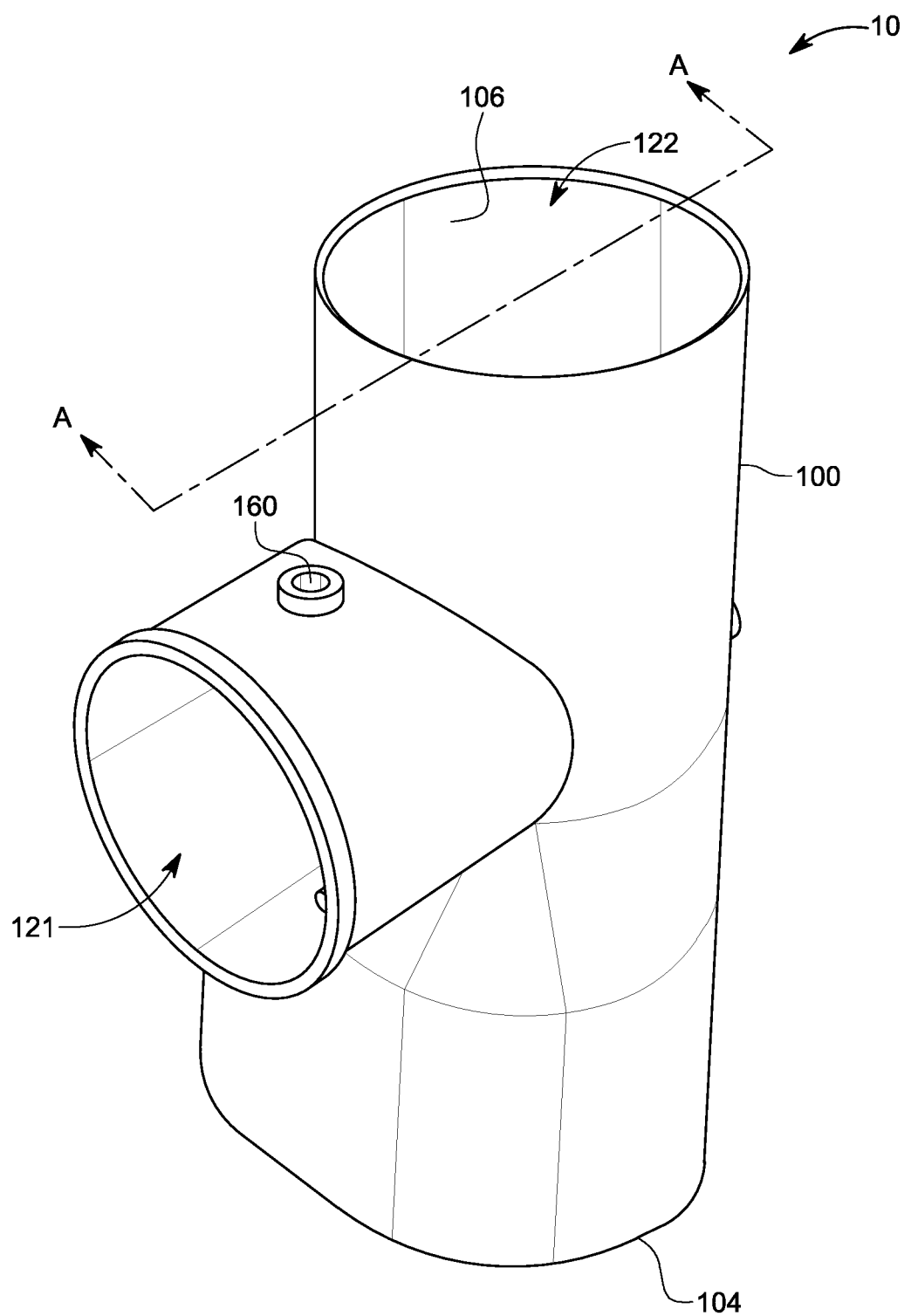
FIGS. 1A to 1E illustrate a conduit fitting with an integrated condensate trap in accordance with example embodiments of the present disclosure.
Figure 1B:
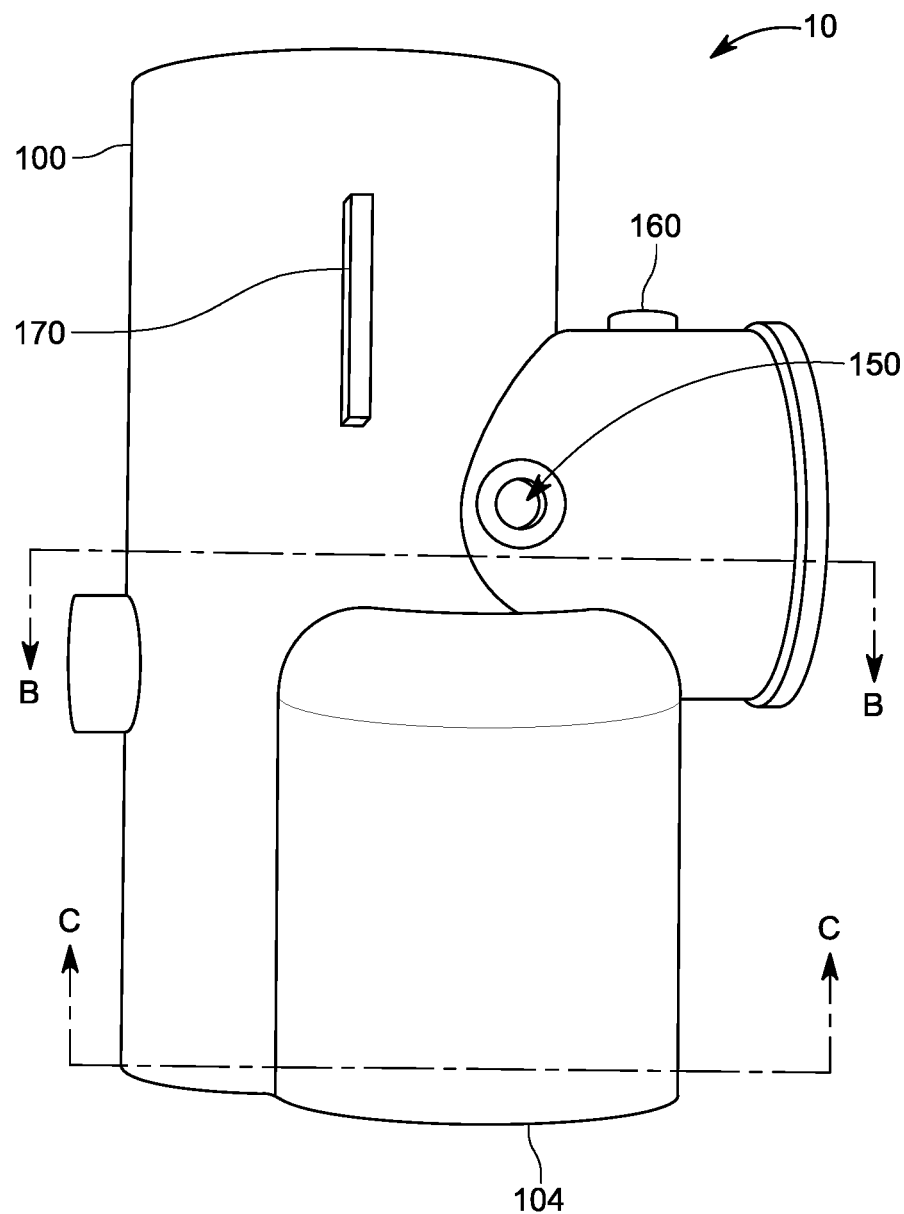

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

In the foregoing figures showing example embodiments of conduit fittings, one or more of the components shown may be omitted, repeated, and/or substituted. Accordingly, the example embodiments of conduit fittings should not be considered limited to the specific arrangements of components shown in any of the figures. For example, features shown in one or more figures or described with respect to one embodiment can be applied to another embodiment associated with a different figure or description.

DETAILED DESCRIPTION OF EXAMPLE EMBODIMENTS

The present disclosure is directed to a conduit fitting that can form part of an exhaust duct and that has a condensate trap to facilitate the pooling of condensate formed as flue gas cools within the exhaust duct. The condensate trap is configured to couple with a drain conduit for draining the pooled condensate, and the conduit fitting is configured so that the exhaust gas does not exit through the drain conduit. Moreover, the condensate trap can be configured to hold a neutralizing agent to neutralize acidic condensate as it collects in the trap.

Some representative embodiments will be described more fully hereinafter with example reference to the accompanying drawings that illustrate embodiments of the invention. The invention may, however, be embodied in many different forms and should not be construed as limited to the embodiments set forth herein; rather, these embodiments are provided so that this disclosure will be thorough and complete, and will fully convey the scope of the invention to those appropriately skilled in the art.

Turning now to FIGS. 1A to 1E (collectively FIG. 1), these figures describe a conduit fitting 10 according to some example embodiments of the disclosure. As further described below, the conduit fitting 10 comprises a reservoir 130 for collecting condensate and is configured to maintain a proper draft pressure, e.g., a negative pressure relative to the pressure in a combustion chamber (e.g., the combustion chamber of a gas burning appliance). Also, the reservoir 130 can be configured to hold a neutralizing agent 350 (FIG. 3) for neutralizing condensate before draining from the reservoir.

In the embodiment shown, conduit fitting 10 comprises a body 100 defining an interior 105 and has a partition 110 that at least partially divides the interior into an upper interior portion 105a and a lower interior portion 105b. The example body 100 shown in FIGS. 1A-3 is a single, unitary structure which can simplify the implementation of a neutralizer and address certain of the challenges identified above in the Background section. However, in alternate embodiments, the body can be an assembly of multiple pieces.

The upper interior portion 105a is configured to be a conduit 120 for exhaust gases. As such, the body 100 also defines a conduit inlet 121 and a conduit outlet 122. In some embodiments, the conduit inlet 121 is configured to couple to another conduit fitting or an exhaust outlet 302 (FIG. 3) of a gas burning appliance 300 (FIG. 3) or other system which produces acidic condensate and requires a drain line for the condensate. Examples of a gas burning appliance include a water heater, boiler, furnace, and the like. An appliance can be a high efficiency appliance, as these tend to produce higher volumes of condensate. In a particular embodiment, the appliance is a high efficiency water heater or boiler.

Figure 3:
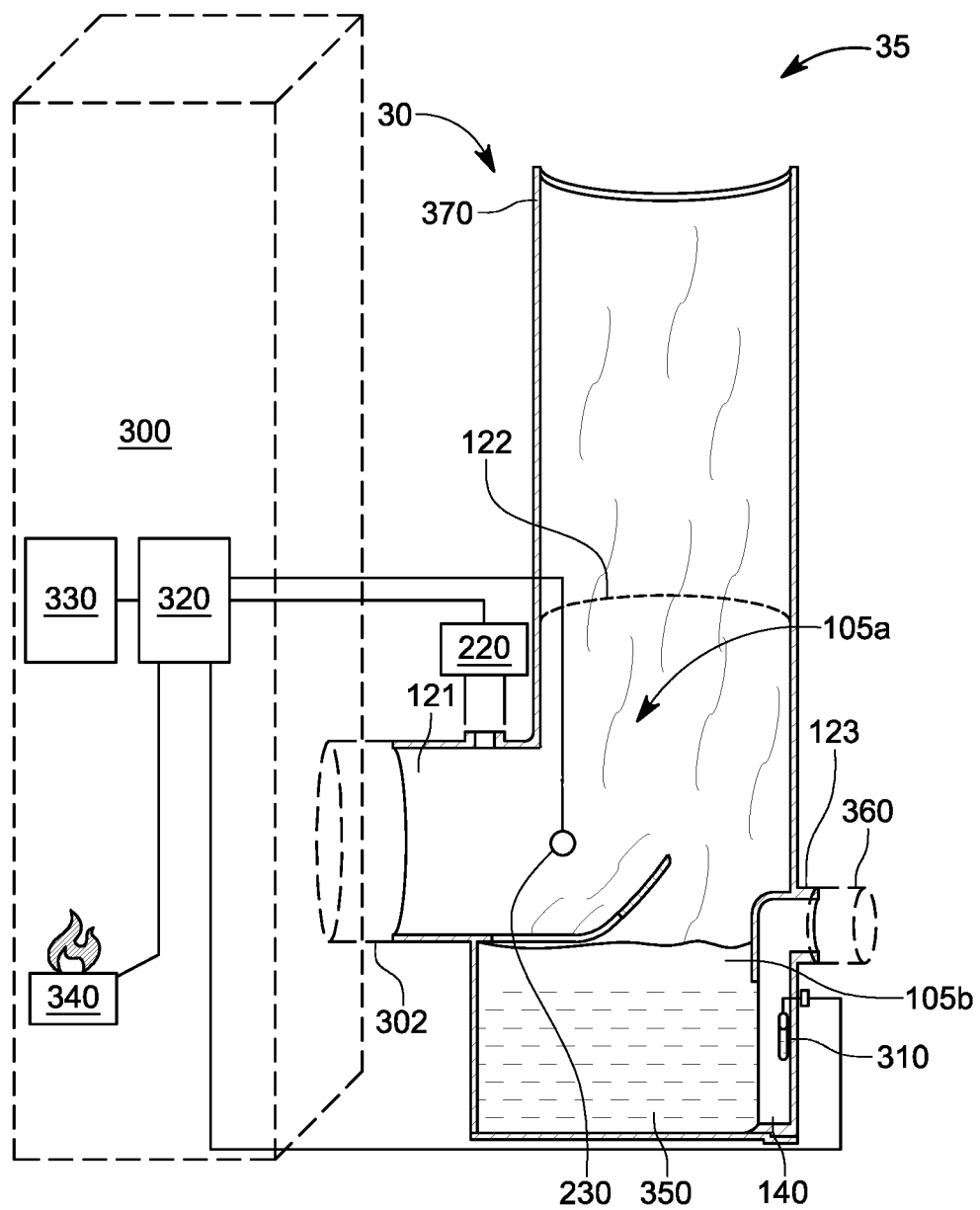
FIG. 3 illustrates a schematic of a system comprising a gas-burning appliance and an exhaust duct comprising a conduit fitting in accordance with example embodiments of the present disclosure. The exhaust duct is shown as a cross-section similar to that of FIG. 1C.
Figure 4:
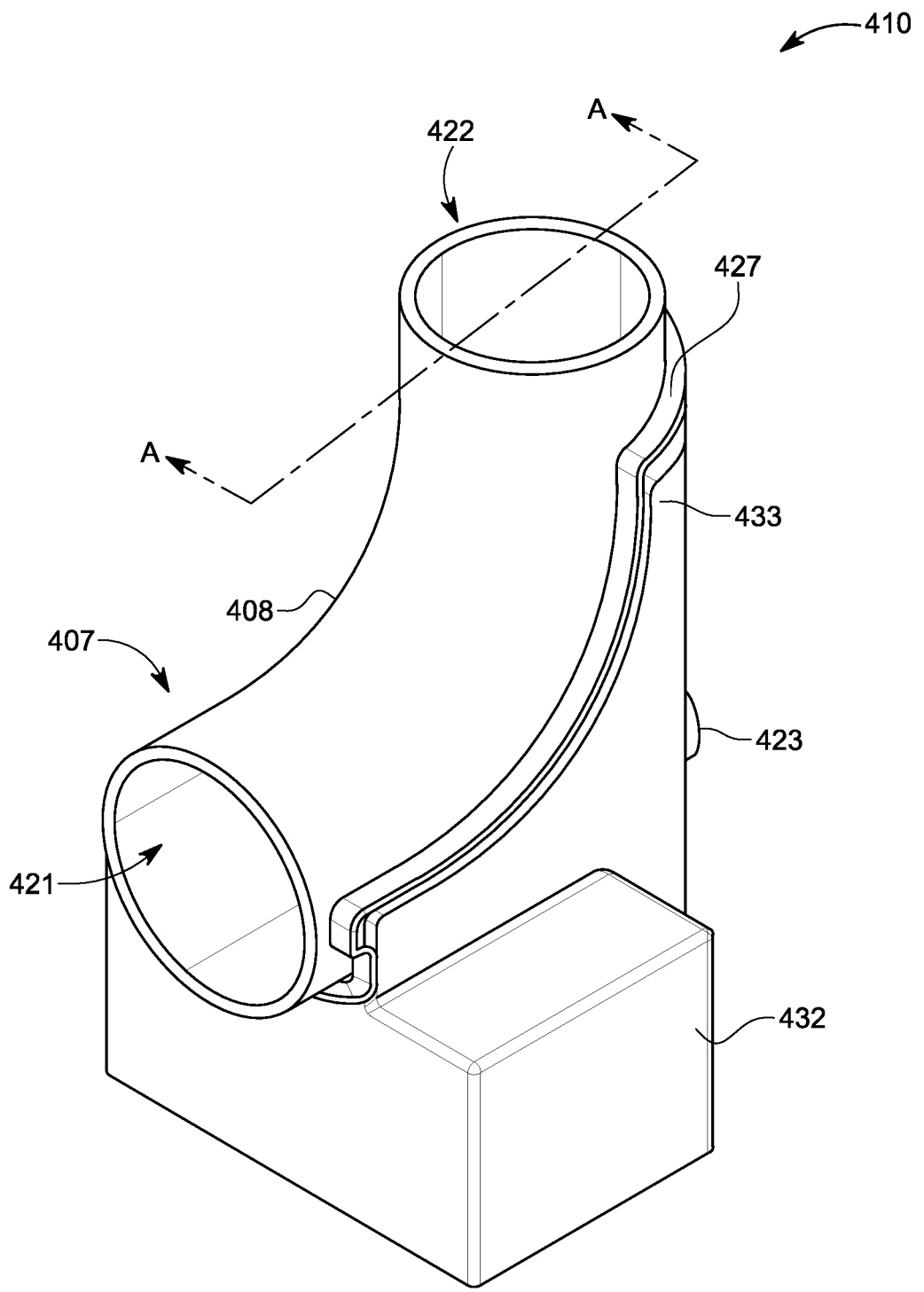
FIG. 4 illustrates a top front perspective view of a conduit fitting with a condensate trap in accordance with an alternate example embodiment of the present disclosure.
Figure 5:
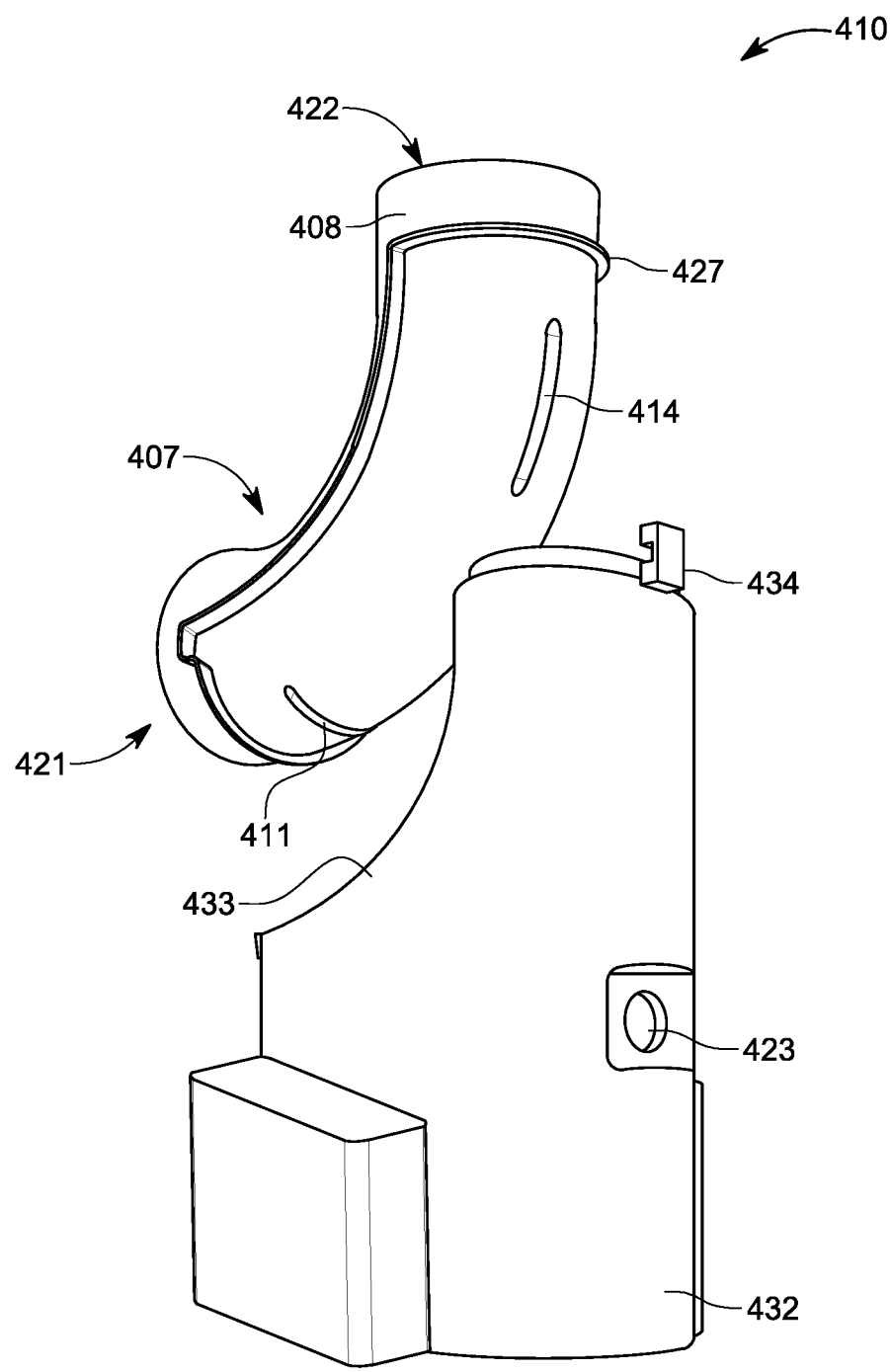
FIG. 5 illustrates a back bottom exploded perspective view of the conduit fitting of FIG. 4 in accordance with an alternate example embodiment of the present disclosure.
Figure 6:
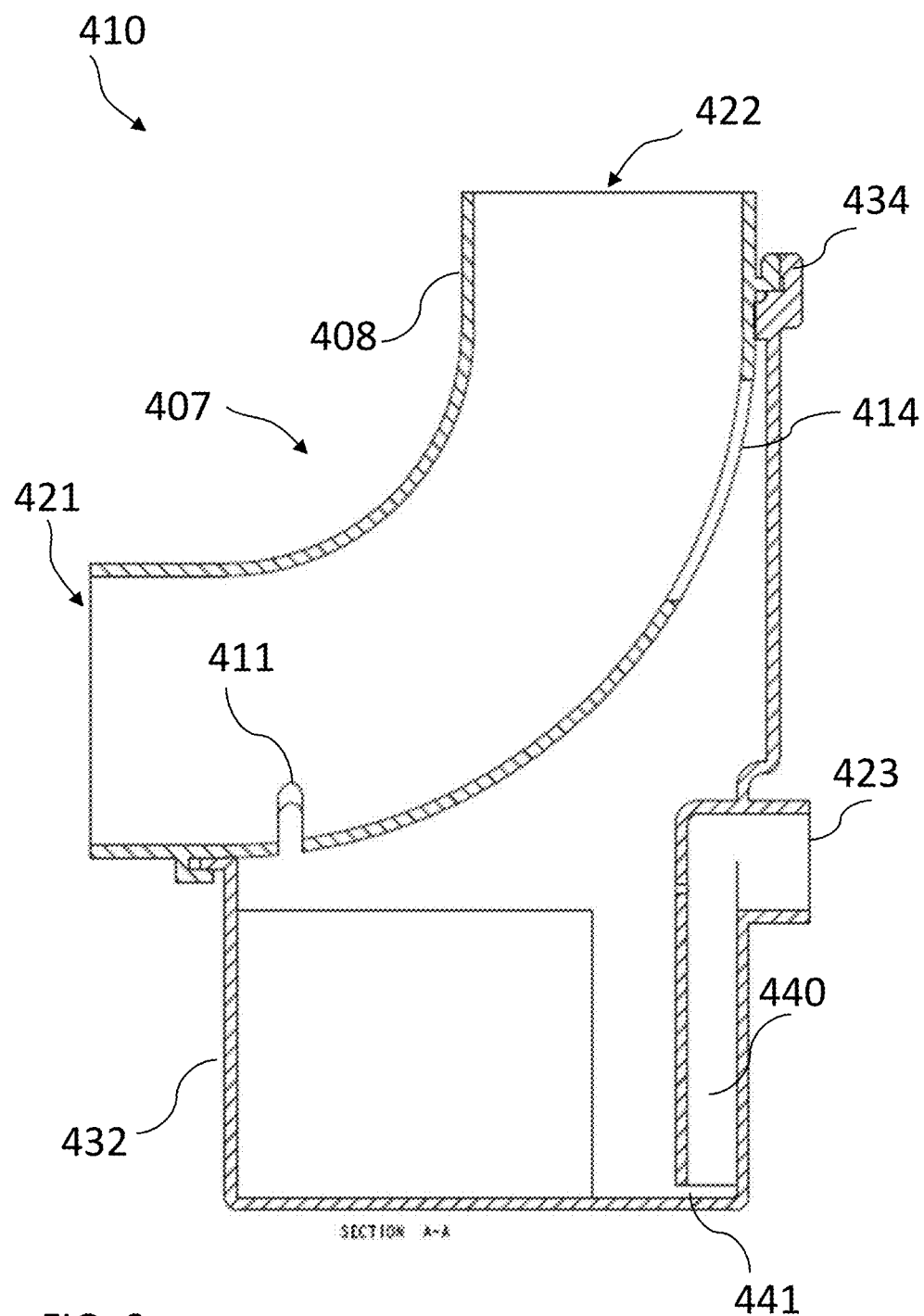
FIG. 6 illustrates a cross-sectional side view taken along line A-A shown in FIG. 4 in accordance with an alternate example embodiment of the present disclosure.

The lower interior portion 105b is configured to be a reservoir 130 for condensate. In addition to holding a liquid, the body can be configured such that the lower interior portion 105b can hold a solid material, such as a neutralizing agent 350 (FIG. 3). In some embodiments, the solid material can be a heavy, rock-like material, and the body 100 can be of a sufficiently durable construction to maintain its structural integrity when filled with the heavy, rock-like material. The body 100 can be configured such that the lower interior portion 105b can contain at least 0.3 kg of a liquid and/or a solid, e.g., 0.3 kg to 1 kg, 1 kg to 2 kg, or 2 kg to 5 kg of a liquid and/or a solid. In some embodiments, the body is comprised of polypropylene. In some embodiments, the neutralizing agent can be pelletized media or chips or fragments of a neutralizing mineral. The neutralizing agent can comprise lime, metal carbonate (e.g., calcite, sodium carbonate, or the like), metal oxide or hydroxide (e.g., magnesium oxide or hydroxide), or other neutralizing substance.

The body 100 defines a reservoir outlet 123 configured for condensate in the lower interior portion 105b to drain through the reservoir outlet 123. The reservoir outlet 123 can be configured to couple with a drain conduit 360 (FIG. 3) to direct the condensate to a desired location, such as a drain. In some embodiments, the reservoir outlet 123 is spaced at a height (the "reservoir outlet height") above the base 104 of the body 100 so that the condensate can accumulate in the lower interior portion 105b before it exits the reservoir outlet 123. This allows for a higher residence time of the condensate with the neutralizing agent 350 within the lower interior portion 105b ensuring sufficient neutralization. In some embodiments, the body 100 can be configured so that the lower interior portion 105b collects at least 200 mL of condensate (e.g., 0.5 L to 1.5 L, 1.5 L to 3 L, or 3 L to 5 L of condensate) before the condensate drains from the reservoir outlet 123.

In some embodiments, the body 100 can further be configured such that solid material (e.g. the neutralizing agent 350) contained therein does not obstruct or exit through the reservoir outlet 123. For example, in the embodiment shown, the conduit fitting 10 comprises a reservoir conduit 140 that fluidly connects the lower interior portion 105b to the reservoir outlet 123. To prevent the solid material from entering the reservoir conduit 140, the reservoir conduit can have a reservoir conduit inlet 141 that is near the base 104 of the body 100 and spaced apart from the base 104 a distance that would prevent a particle of solid material from entering into the reservoir conduit 140. For example, this distance can be less than the minimum dimension of the particle size of the solid material, such as 0.2 to 5 mm. As shown in the example of FIG. 1, the reservoir conduit 140 can be located along or formed as an integral part of the wall of the body 100 of the conduit fitting 10 so that the reservoir conduit 140 extends from near the base 104 up along the wall of the body 100 to the reservoir outlet 123 located in the wall of the body 100. The position of the reservoir conduit 140 also assists in preventing exhaust gas from exiting through the reservoir outlet 123.

The partition 110 is located within the interior 105 and comprises an upper surface 112 that partially defines the conduit 120 and a lower surface 113 that partially defines the reservoir 130. The partition 110 can comprise a portion of the wall that defines the conduit inlet 121 and the partition extends into the conduit 120. The partition 110 may completely or only partially divide the interior 105. In either case, the partition 110 defines one or more openings 111 (also referred to as a first set of openings or a first opening) that fluidly connect the upper interior portion 105a to the lower interior portion 105b. The one or more openings 111 are configured to permit a liquid (e.g., aqueous condensate) to pass through the opening(s) 111 so that liquid can drain from the upper interior portion 105a to the lower interior portion 105b. At least one of the one or more openings 111 can be located where a liquid would naturally flow during use, e.g., the portion 110a of the partition 110 closest to the base 104. In the embodiment shown, opening 111 is closer to the conduit inlet 121 than the conduit outlet 122.

The one or more openings 111 can be any shape, such as circular, rectangular, or the like. In the embodiment shown, opening 111 is a slot having a length 111a greater than a width 111b, where the length 111a of the slot extends in the direction of the exhaust gas flow through the conduit 120.

The conduit 120 can comprise a bend to redirect the exhaust, e.g., to direct exhaust upward and toward the conduit outlet 122. In some embodiments, the conduit 120 redirects flow at least 35°, e.g., 45° to 80° or 80° to 100°. In certain embodiments, flow is redirected about 90°. The upper interior surface 106 of the upper interior portion 105a and the partition upper surface 112 can be curved and/or sloped to redirect flow accordingly. In particular, the partition 110 and the upper interior surface 106 can be sloped and/or curved to direct exhaust upward (i.e., away from the lower interior portion 105b). The partition 100 can be sloped and/or curved to minimize undesirable pressure drops within the conduit 120 during use.

Figure 1C:
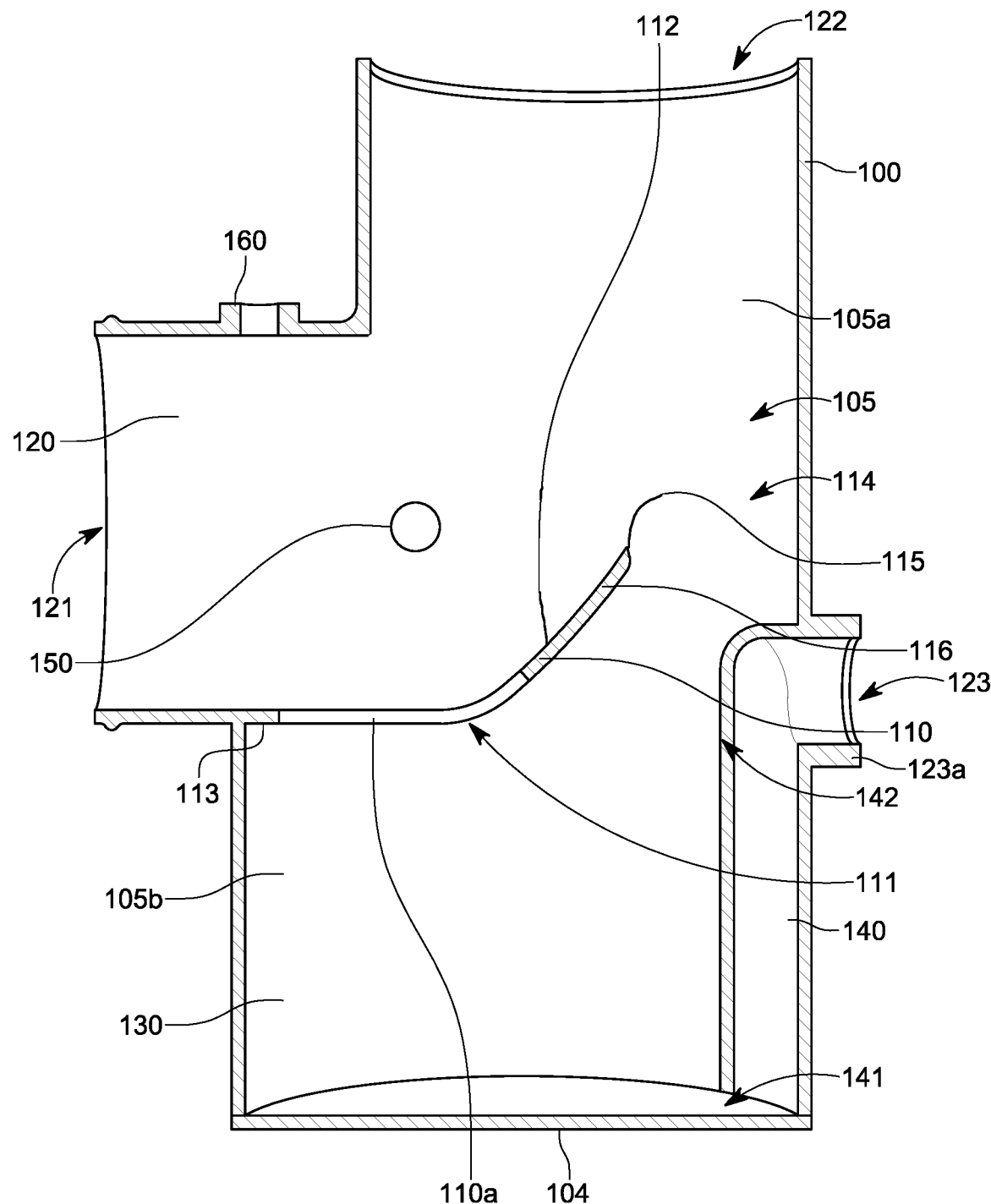
Figure 1D:
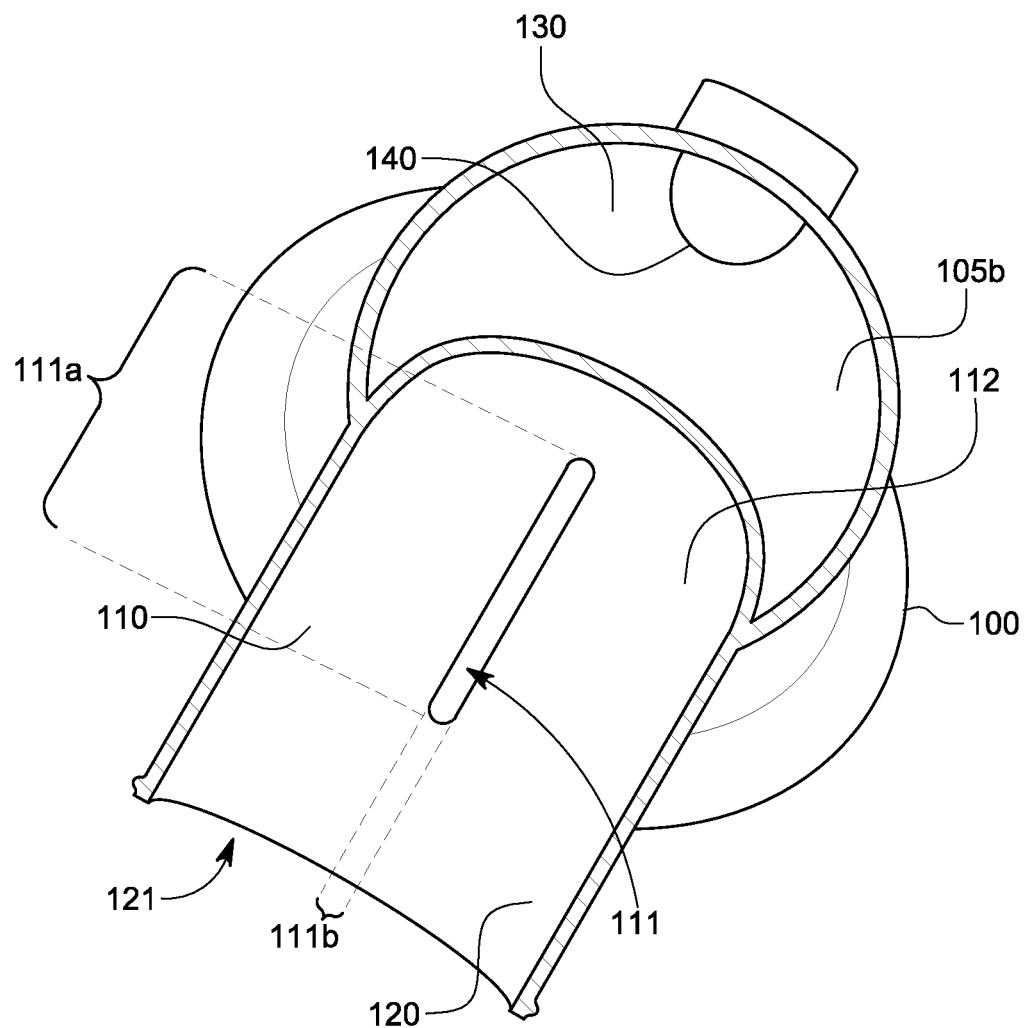
Figure 1E:
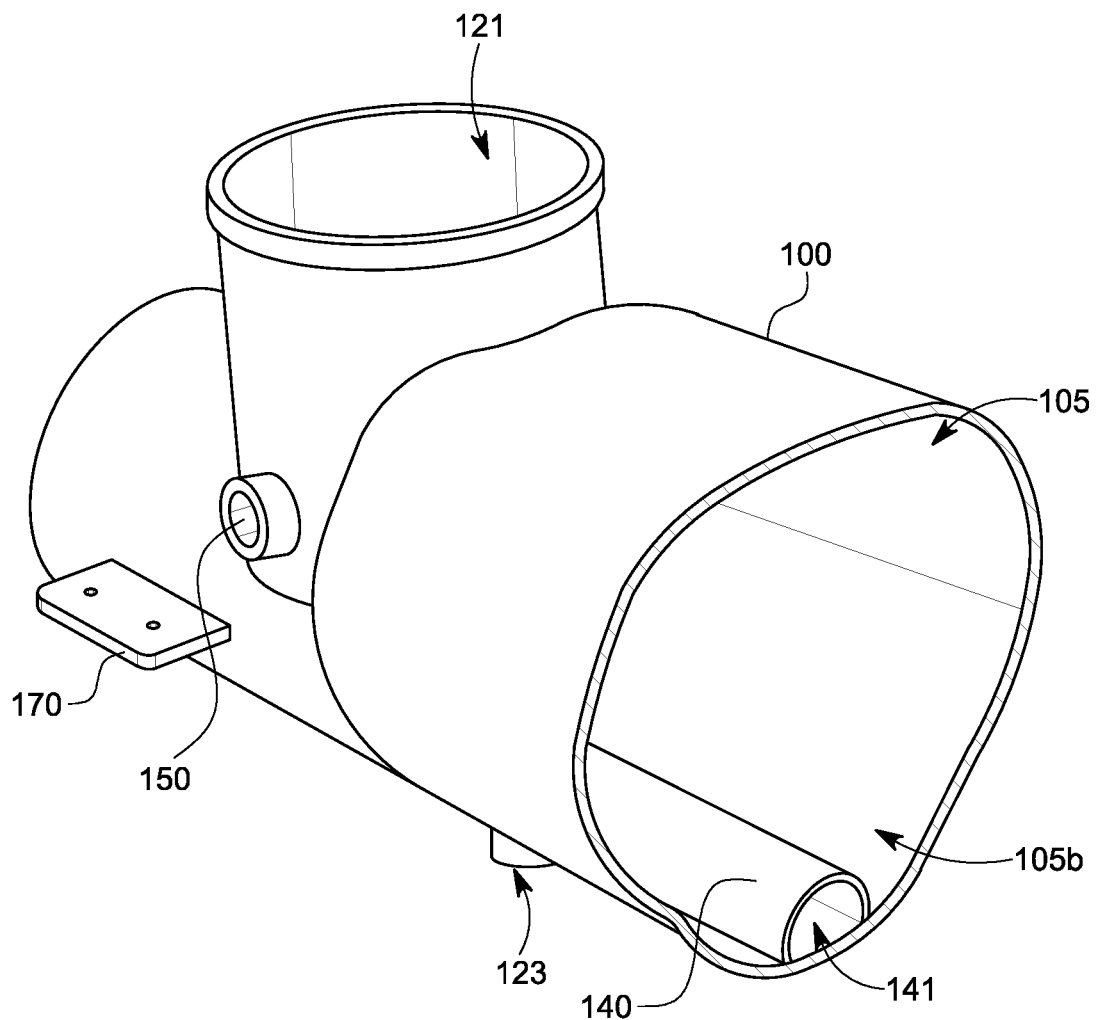

While not required, the partition 110 can define a second opening 114 that can be larger in total cross-sectional area than the first opening(s) 111. Alternatively, the partition 110 can only partially divide the interior, thereby partially defining a second opening 114. In the embodiment shown in FIGS. 1A-3, the partition 110 partially divides the interior 105. In particular, the partition 110 extends from the conduit inlet 121 but not from the conduit outlet 122. As such, the partition 110 can have a partition end 115 that is a free end located within the interior of the body 100. In the example embodiment shown in FIGS. 1A-3, the second opening 114 is defined as an opening between the partition end 115 and the interior wall of the body 100. Accordingly, the lower interior portion 105b and the upper interior portion 105a are also in fluid communication via the second opening 114. Additionally, as shown in FIG. 1C, the upper surface 112 and the partition end 115 define a curved surface that directs exhaust gases from a gas burning appliance upward toward the conduit outlet 122. The smooth curved surface defined by the upper surface 112 and the partition end 115 also minimize undesirable pressure drops within the conduit 120 during use.

The conduit fitting 10 is configured so that during use the exhaust gas does not exit the reservoir outlet 123, which would thereby cause condensate to be purged from the lower interior portion 105b. For example, in the embodiment shown, the reservoir conduit 140 defines an anti-syphon hole 142. Anti-syphon hole 142 can be spaced apart from the base 104 at least the distance that the reservoir outlet 123 is spaced apart from the base and more specifically, at least the distance between the base and the lowermost portion 123a of the reservoir outlet 123. Additionally, the lowermost portion 123a of the reservoir outlet 123 is located at a height that is below the lower surface 113 of the partition 110 so that condensate collecting in the reservoir 130 does not flow back through the conduit inlet 121 and into the gas burning appliance. In some embodiments, the reservoir can be at least partially filled with a fluid such as water prior to collecting condensate.

The body 100 can also comprise other elements related to ensuring the safe operation of a gas combustion appliance. For example, in some embodiments, the body 100 can define a sensor port 150 configured to receive a temperature sensor for measuring the temperature within the upper interior portion 105a. In some embodiments, the body 100 can define a pressure port 160 configured to couple to a pressure switch for measuring the pressure within the upper interior portion 105a. Additionally, in some embodiments, the body 100 can comprise a mounting bracket 170 for securing the conduit fitting 10 to a gas-burning appliance or other stable structure.

Figure 2:
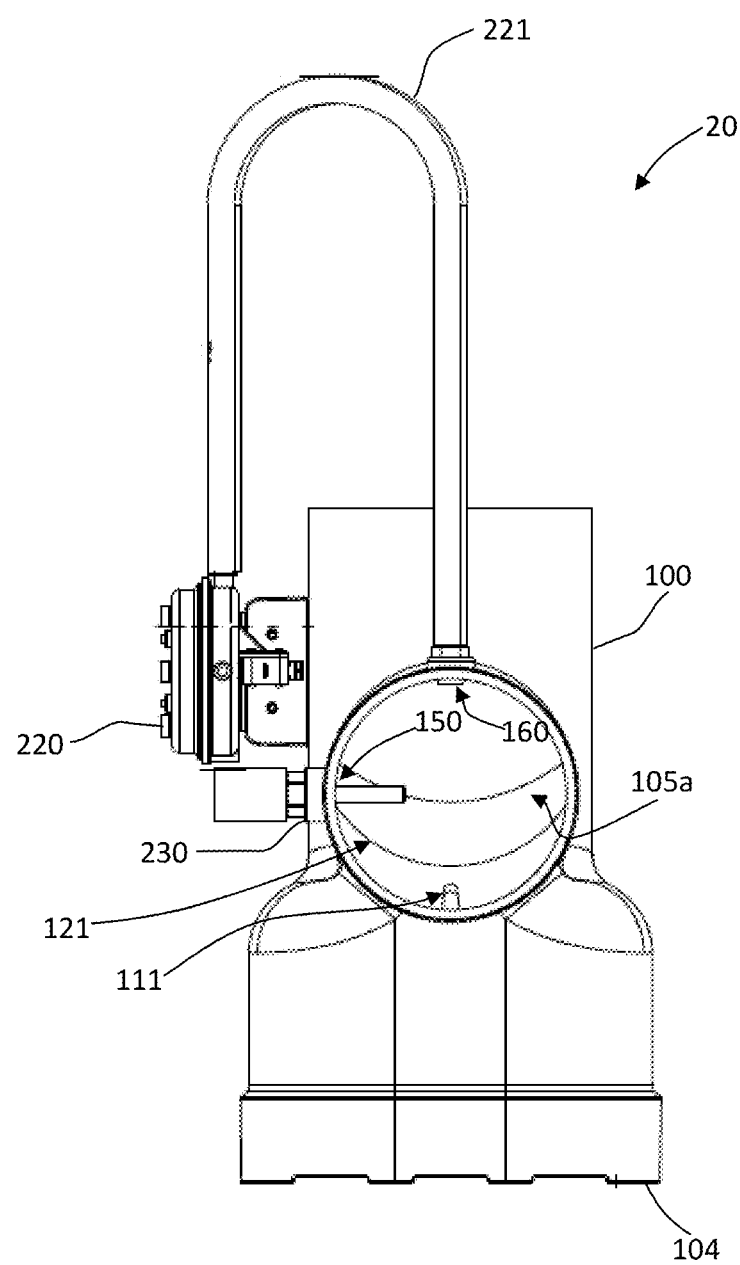
FIG. 2 illustrates front view a conduit fitting in accordance with example embodiments of the present disclosure.

Turning now to FIG. 2, an example embodiment of conduit fitting 20 is illustrated from a front view. Conduit fitting 20 is the same as conduit fitting 10 illustrated in FIG. 1 except that it further comprises a pressure switch 220 and a temperature sensor 230. Accordingly, elements shown in conduit fitting 20 that are the same or similar to components shown in conduit fitting 10 are given the same reference number and the description of those components will not be repeated.

The pressure switch 220 is in fluid communication, such as via tube 221, with the pressure port 160 to determine the pressure or relative pressure in the upper interior portion 105a. The temperature sensor 230 is coupled to the sensor port 150 to determine the temperature in the upper interior portion 105a.

Turning now to FIG. 3, an example embodiment of gas burning appliance system 35 comprising conduit fitting 30 is illustrated. Conduit fitting 20 illustrated in FIG. 2 is the same as the conduit fitting 30 except that conduit fitting 30 further comprises a pH sensor 310 and is part of a system 35 comprising a gas burning appliance 300, a controller 320, a display device 330, and a gas valve actuator 340. Accordingly, elements shown in conduit fitting 30 that are the same or similar to components shown in conduit fitting 10 or conduit fitting 20 are given the same reference number and the description of those components will not be repeated.

In the embodiment shown, the conduit inlet 121 of conduit fitting 30 is coupled to and in fluid communication with the exhaust outlet 302 of gas burning appliance 300.

The pressure switch 220 and the temperature sensor 230 are connected to the controller 320 of the gas burning appliance 300. Signals from the pressure switch 220 and/or the temperature sensor 230 if outside of defined parameters can cause the controller 320 to shut off the flow of gas to the burner via a gas valve actuator 340.

In some embodiments, conduit fitting 30 can comprise a sensor 310 configured to detect pH of condensate that collects within the conduit fitting 30. In the example shown in FIG. 3, the pH sensor 310 is positioned within the reservoir conduit 140. However, it should be understood that in alternate embodiments, the pH sensor 310 can be located within the lower interior portion 105b, at the reservoir outlet 123, or at another location downstream of the reservoir outlet. The pH sensor 310 can be connected to controller 320. A pH threshold can be defined and once the pH level drops below the defined threshold, the controller 320 can trigger an alert to indicate that it is time to change the neutralizing agent 350, such as displaying a text message on a display device 330, triggering an alarm, or turning on an indicator light. In some embodiments, the pH threshold is 6, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0.

In addition to pH or alternatively, other variables that can be tracked to determine when the neutralizing agent 350 should be exchanged can include an amount of time that the neutralizing agent has been in use or the number of operating hours (e.g., gas combustion time) of the gas burning appliance 300 during which the neutralizing agent has been in use.

In some embodiments, replacing a neutralizing agent 350 within the conduit fitting 30 can comprise removing the exhausted neutralizing agent from the conduit fitting 30 by way of the conduit inlet 121 or the conduit outlet 122 and adding new neutralizing agent into the conduit fitting 30 by way of the conduit inlet 121 or the conduit outlet 122. The conduit fitting 30 can be detached from the exhaust outlet 302 of appliance 300 and/or from the adjacent exhaust duct segment 370 to remove and/or add neutralizing agent 350. Removing the neutralizing agent 350 can comprise tilting the conduit fitting to pour the neutralizing agent out from the conduit outlet. The method can comprise reading a signal from the controller 320 indicating that neutralizing agent should be exchanged.

The embodiment illustrated in FIGS. 1A-3 shows the conduit fitting and condensate trap integrated as a single integrated body. In contrast, in the example embodiment illustrated in FIGS. 4-7, the conduit fitting 410 comprises two separable components, namely an elbow 407 and a condensate collector 432. By configuring the condensate collector 432 as easily separable from the elbow 407, the conduit fitting 410 can facilitate the addition or replacement of a neutralizing material located within the condensate collector 432. In other words, the condensate collector 432 can be easily separated from the elbow 407 without detaching the elbow 407 from other components such as an exhaust outlet 402 of a gas burning appliance or an exhaust duct 470. Once the condensate collector 432 is separated from the elbow 407, the neutralizing material can easily be inserted into the condensate collector 432.

Figure 7:
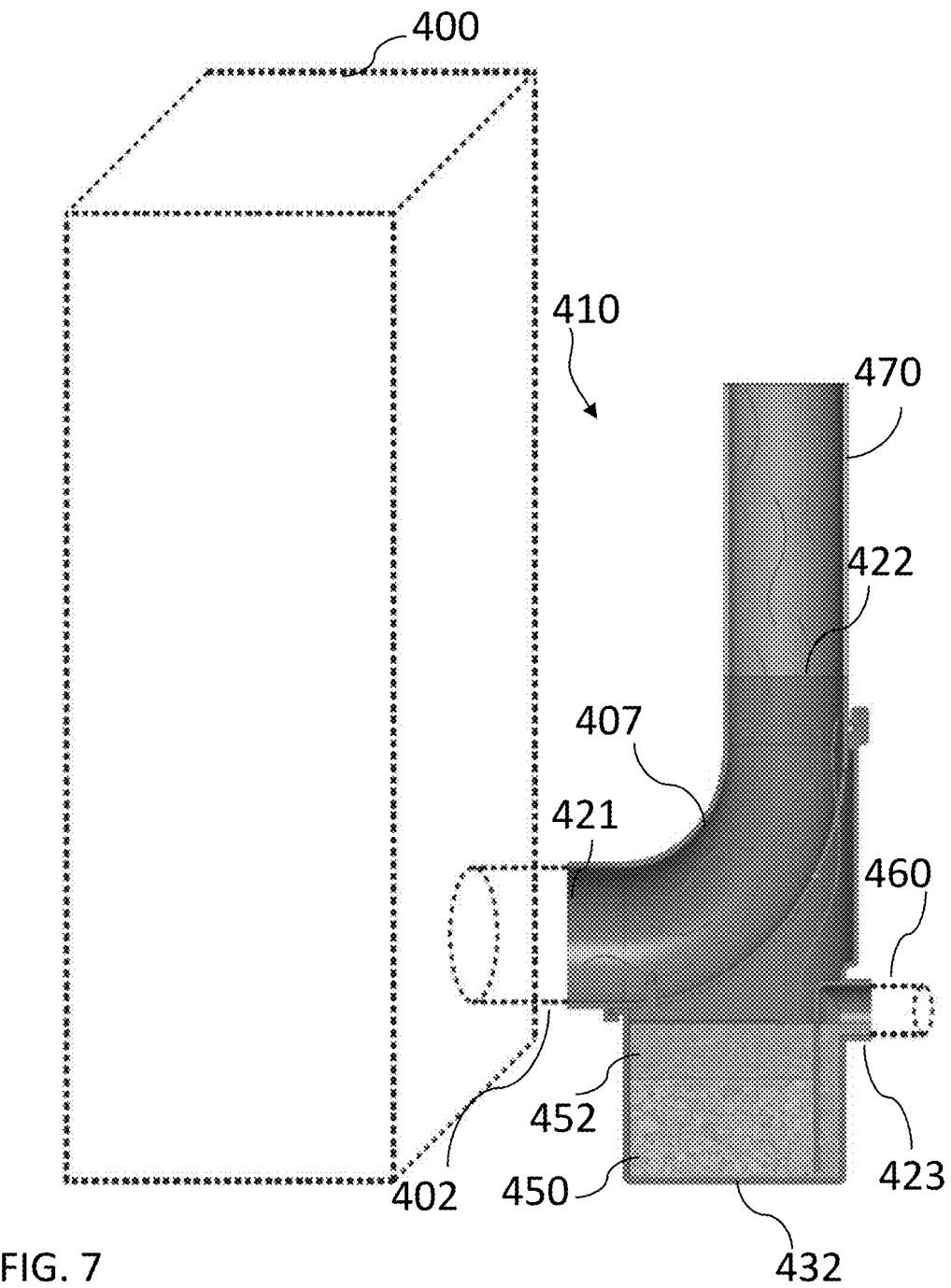
FIG. 7 illustrates a schematic of a system comprising a gas-burning appliance and exhaust duct comprising the conduit fitting of FIG. 4 in accordance with an alternate example embodiment of the present disclosure.

The elbow 407 comprises a wall 408 in the shape of a bent cylinder, a conduit inlet 421, and a conduit outlet 422. The conduit inlet 421 can attach to an exhaust outlet 402 of a gas burning appliance 400 for receiving exhaust gas, as shown in FIG. 7. The conduit outlet 422 can attach to an exhaust duct 470 for conveying exhaust gas to a vent, as also shown in FIG. 7. The bent, cylindrical shape of the wall 408 provides a smooth interior passage for the exhaust gas thereby minimizing an undesirable drop in pressure as the exhaust gas passes through the elbow.

A flange 427 extends from the wall 408 and is shaped so that the flange fits on a top edge 433 of the condensate collector 432. The flange 427 also can be secured to the top edge 433 with a releasable securing tab 434. When separating the condensate collector 432 from the elbow 407, the releasable securing tab 434 can be pushed outward so that the condensate collector 432 slides apart from the elbow 407. It should be understood that the flange 427 and the releasable securing tab 434 are optional and that in alternate embodiments, the elbow 407 can be secured to the condensate collector 432 using other fastening features such as a snap fit or other types of fasteners.

Similar to the previous description in connection with FIGS. 1A-3, condensate can form on the interior of the conduit fitting 410 or within the exhaust duct 470. The wall 408 of the elbow 407 also comprises one or more openings that permit condensate to drain from the elbow 407 and down into the condensate collector 432. In the example embodiment shown in FIGS. 5 and 6, the wall 408 is shown with a first opening 411 and a second opening 414. While the example conduit fitting 410 shows first opening 411 as a slot positioned toward the bottom of the elbow 407 and second opening 414 as a slot positioned toward the top of the elbow 407, alternate embodiments of the elbow may have more or fewer opening with different shapes or positions.

While the separable configuration of the condensate collector 432 is distinct from the conduit fitting 10 of FIGS. 1A-3, in most other respects the condensate collector 432 can be similar to the reservoir 130 of conduit fitting 10. For example, as shown in FIGS. 4-7, the condensate collector 432 can comprise a reservoir conduit 440 formed as integral part of the condensate collector 432 and the reservoir conduit 440 can comprise a reservoir inlet 441 and a reservoir outlet 423. The condensate collector 432 can also be configured to contain a neutralizing agent 450. Similar to the description in connection with conduit fitting 10, the reservoir outlet 423 can be disposed at a height (the "reservoir outlet height") so that condensate can collect with sufficient time to interact with the neutralizing agent 450 before the condensate exits the condensate collector 432. Additionally, the lowest portion of the reservoir outlet 423 can be positioned at a height that is below the lowest portion of the elbow 407 so that condensate does not flow back into the elbow 407, through the conduit inlet 421 and exhaust outlet 402, and into the gas burning appliance 400. As illustrated in the example shown in FIG. 7, the reservoir conduit 423 can be attached to a drain conduit 460 that receives the condensate after it has been treated by the neutralizing agent 450.

Similar to the example shown in FIG. 3, FIG. 7 illustrates conduit fitting 410 attached to a gas burning appliance 400. As gas is burned in the appliance, exhaust gas passes through the exhaust outlet 402 to the conduit inlet 421 of conduit fitting 410. The bent cylindrical surface of the wall 408 of elbow 407 directs the exhaust gas to exhaust duct 470, while the smooth curve of wall 408 minimizes undesirable pressure drops within the flow of the exhaust gas. As condensate forms on the interior of the wall 408 or the interior of the exhaust duct 470, the condensate can drain downward through openings 411 and 414 and collect in the condensate collector 432. The acidic condensate 452 is treated with the neutralizing agent 450 while it collects in the condensate collector 432. The neutralized condensate is then expelled through the reservoir outlet 423.

Many of the features and components of conduit fitting 410 are similar to those associated with conduit fitting 10 of FIGS. 1A-3 and their description will not be repeated. For example, although not illustrated in FIG. 7, one or more of the components and features similar to those shown in FIG. 3, such as a controller, a pressure sensor, a temperature sensor, or a pH sensor, can be implemented in conduit fitting 410 in a manner similar to that described previously in connection with conduit fitting 10.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:
1. A conduit fitting comprising:
a body defining an interior and comprising a partition that at least partially divides the interior into an upper interior portion and a lower interior portion;
wherein the upper interior portion is configured to be a conduit and the lower interior portion is configured to be a reservoir for condensate;
wherein the body defines a conduit inlet and a conduit outlet;

wherein the partition defines a first opening that fluidly connects the upper interior portion to the lower interior portion;

wherein the conduit inlet is configured to couple to an exhaust outlet of a gas burning appliance;

wherein the body comprises a reservoir outlet; and wherein the body comprises a base and wherein a lowest portion of the reservoir outlet is disposed at a height that is above the base and below the partition.

2. The conduit fitting of claim 1, wherein the partition at least partially defines a second opening located between the first opening and the conduit outlet, the second opening fluidly connecting the upper interior portion and the lower interior portion.

3. The conduit fitting of claim 1, wherein the partition is sloped or curved and is configured to direct exhaust upward toward the conduit outlet.

4. The conduit fitting of claim 1, further comprising a reservoir conduit, wherein the reservoir conduit fluidly connects the lower interior portion to the reservoir outlet.

5. The conduit fitting of claim 1, wherein the conduit fitting is configured to redirect a flow of exhaust gas at least 45°.

6. The conduit fitting of claim 1, wherein the body is configured such that the lower interior portion contains a neutralizing agent.

7. The conduit fitting of claim 1, further comprising a sensor configured to detect pH of the condensate collected in the reservoir.

8. The conduit fitting of claim 1, wherein the body is single piece.

9. A conduit fitting comprising:
an elbow and a condensate collector;
the elbow comprising:
  a conduit inlet;
  a conduit outlet;
  a wall; and
  at least one opening in the wall of the elbow,
    wherein the elbow is configured to attach to the condensate collector;
the condensate collector comprising a reservoir outlet; and
wherein the condensate collector further comprises a reservoir conduit connecting an interior of the condensate collector with the reservoir outlet.

10. The conduit fitting of claim 9, wherein the elbow comprises a flange extending from an exterior surface of the elbow, the flange arranged to rest on a top edge of the condensate collector.

11. The conduit fitting of claim 9, wherein the elbow comprises a curved surface configured to redirect a flow of exhaust gas at least 45°.

12. The conduit fitting of claim 9, wherein the condensate collector is configured to contain a neutralizing agent.

13. The conduit fitting of claim 9, wherein the condensate collector comprises a base and wherein a lowest portion of the reservoir outlet is disposed at a height that is above the base and below the elbow.

14. The conduit fitting of claim 9, further comprising a sensor configured to detect pH of a condensate in the condensate collector.

15. The conduit fitting of claim 9, wherein the at least one opening in the wall of the elbow permits condensate to drain into the condensate collector.

16. The conduit fitting of claim 9, wherein the elbow is configured to attach to a gas burning appliance.

17. The conduit fitting of claim 16, wherein the condensate collector can be detached from the elbow without removing the elbow from the gas burning appliance.

18. A conduit fitting comprising:
a body defining an interior and comprising a partition that at least partially divides the interior into an upper interior portion and a lower interior portion;
wherein the upper interior portion is configured to be a conduit and the lower interior portion is configured to be a reservoir for condensate;
wherein the body defines a conduit inlet and a conduit outlet;
wherein the partition defines a first opening that fluidly connects the upper interior portion to the lower interior portion; and
wherein the conduit inlet is configured to couple to an exhaust outlet of a gas burning appliance;
wherein the body comprises a reservoir outlet and a reservoir conduit fluidly connecting the lower interior portion to the reservoir outlet.

19. A conduit fitting comprising:
an elbow and a condensate collector;
the elbow comprising:
  a conduit inlet;
  a conduit outlet;
  a wall;
  at least one opening in the wall of the elbow; and
  a flange extending from an exterior surface of the elbow, the flange arranged to rest on a top edge of the condensate collector,
    wherein the elbow is configured to attach to the condensate collector; and the condensate collector comprising a reservoir outlet.

20. A conduit fitting comprising:
an elbow and a condensate collector; the elbow comprising:
a conduit inlet;
  a conduit outlet;
  a wall; and
  at least one opening in the wall of the elbow,
    wherein the elbow is configured to attach to the condensate collector; and the condensate collector comprising a reservoir outlet,
wherein the condensate collector is configured to contain a neutralizing agent.

21. A conduit fitting comprising:
an elbow and a condensate collector;
the elbow comprising:
  a conduit inlet;
  a conduit outlet;
  a wall; and
  at least one opening in the wall of the elbow,
    wherein the elbow is configured to attach to the condensate collector; and
the condensate collector comprising a reservoir outlet and a base,
wherein a lowest portion of the reservoir outlet is disposed at a height that is above the base and below the elbow.

22. A conduit fitting comprising:
an elbow and a condensate collector;
the elbow comprising:
  a conduit inlet;
  a conduit outlet;
  a wall; and
  at least one opening in the wall of the elbow, wherein the elbow is configured to attach to the condensate collector and a gas burning appliance; and
the condensate collector comprising a reservoir outlet.

\* \* \* \* \*